United States Patent [19]

Juravic

[11] Patent Number: 4,815,919

[45] Date of Patent: Mar. 28, 1989

[54] APPARATUS FOR REMOVING ADHERED FOOD PRODUCT FROM TRAY LATTICE

[75] Inventor: Davor Juravic, San Pedro, Calif.

[73] Assignee: Star-Kist Foods, Inc., Long Beach, Calif.

[21] Appl. No.: 146,615

[22] Filed: Jan. 20, 1988

[51] Int. Cl.$^4$ ............................................. A47J 27/62
[52] U.S. Cl. ..................................... 414/417; 99/485;
198/406; 198/598; 221/291; 414/403; 414/418
[58] Field of Search ................ 414/403, 404, 416–418,
414/130; 221/291; 99/644, 485, 469, 433 C;
198/406, 483.1, 465.1, 598, 599

[56] References Cited

U.S. PATENT DOCUMENTS

| | | | |
|---|---|---|---|
| 2,617,543 | 11/1952 | Fabey | 414/418 |
| 2,673,652 | 3/1954 | Steadman | 414/418 X |
| 3,310,187 | 3/1967 | Barker et al. | 414/418 X |
| 4,273,496 | 6/1981 | Papalexis | 414/417 |
| 4,274,331 | 6/1981 | Jensen et al. | 99/443 C X |
| 4,636,129 | 1/1987 | Lanham, Jr. | 414/417 |
| 4,645,404 | 2/1987 | Juravic | 414/417 |
| 4,755,096 | 7/1988 | Leeper et al. | 414/416 |

Primary Examiner—Robert J. Spar
Assistant Examiner—David A. Bucci
Attorney, Agent, or Firm—Fulwider, Patton, Rieber, Lee & Utecht

[57] ABSTRACT

An apparatus for separating a food product from a tray having apertures defining a supporting lattice to which the food product is adhered. A conveyor belt carries the tray in an inverted position with the food product on the bottom and engaging the upper surface of the belt. The undersurface of the belt is slidably supported by a first row of fixed, transversely spaced apart supports. A first row of roller bands with radially directed fingers is located above the belt with the roller bands midway between the supports. The fingers project through the tray apertures and move the product away from the tray and toward the conveyor belt. The conveyor belt sags between the supports, providing room for the product to move for separation from the tray.

14 Claims, 5 Drawing Sheets

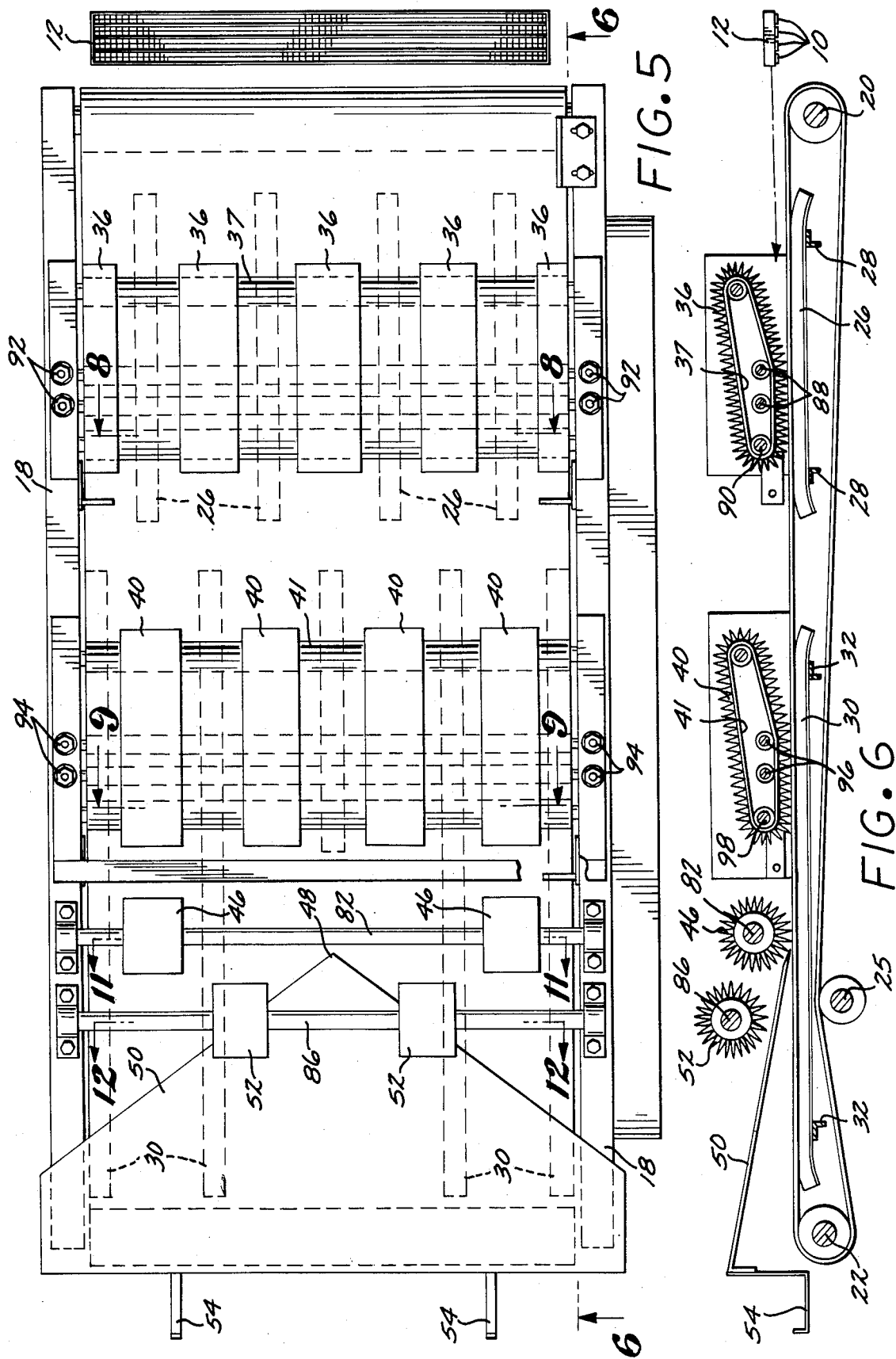

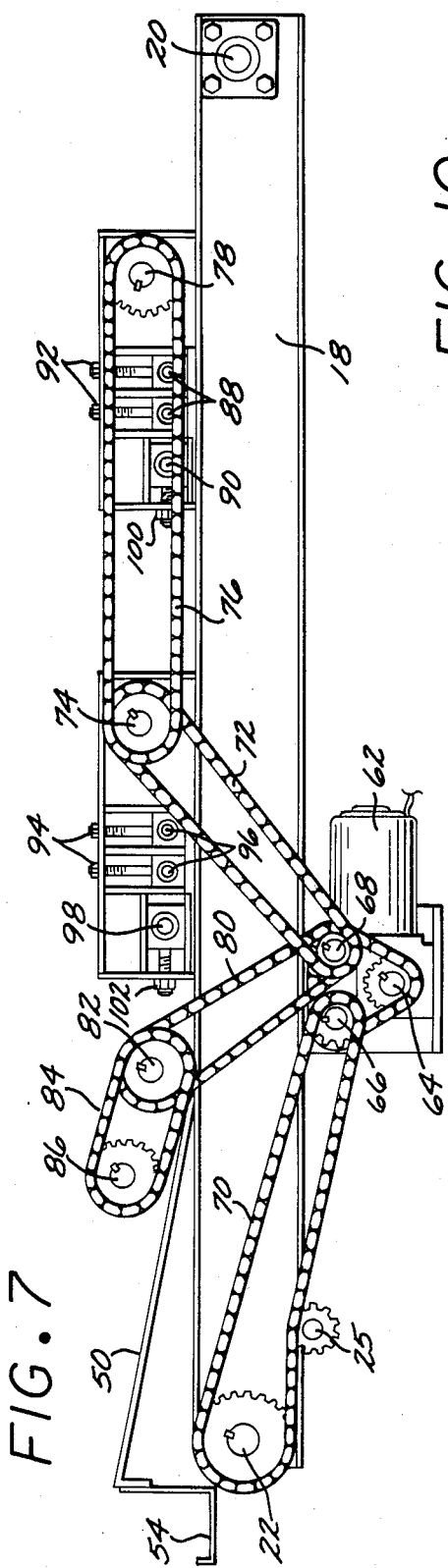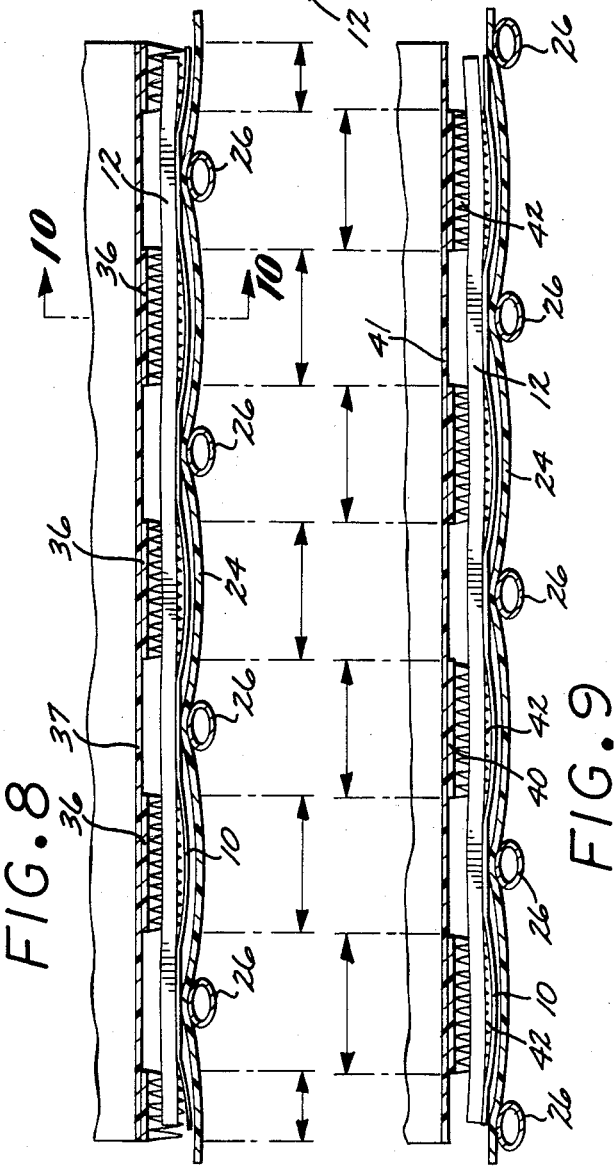

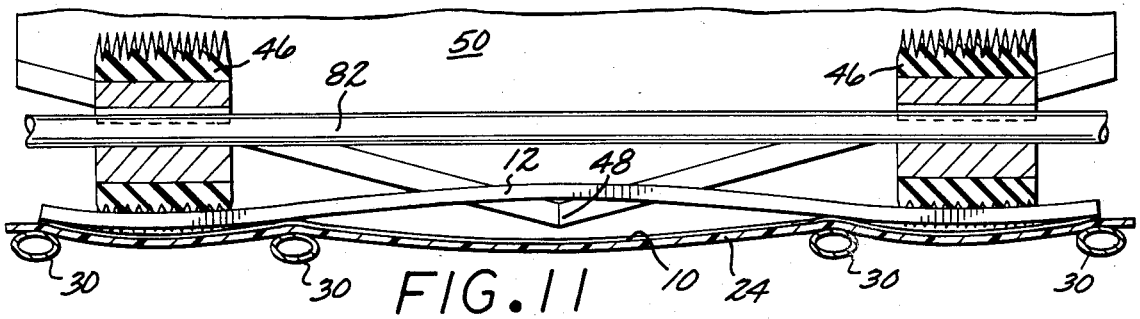
FIG. 11
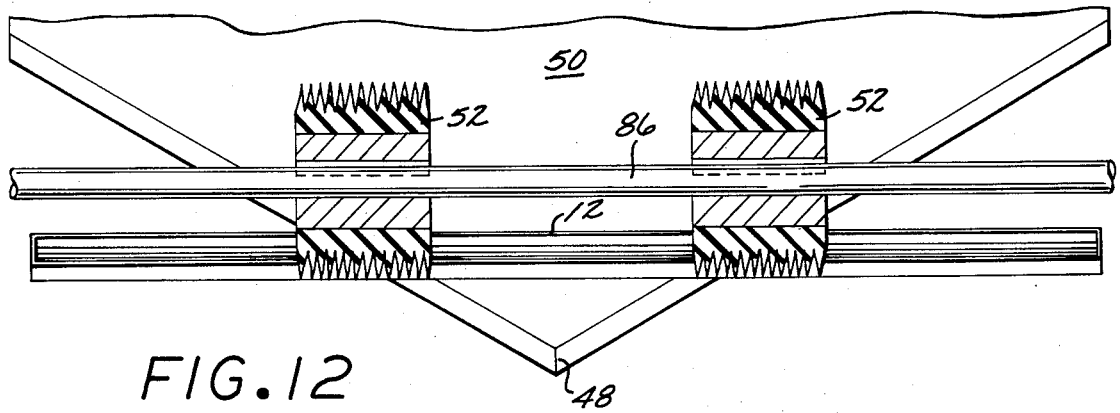
FIG. 12
FIG. 13
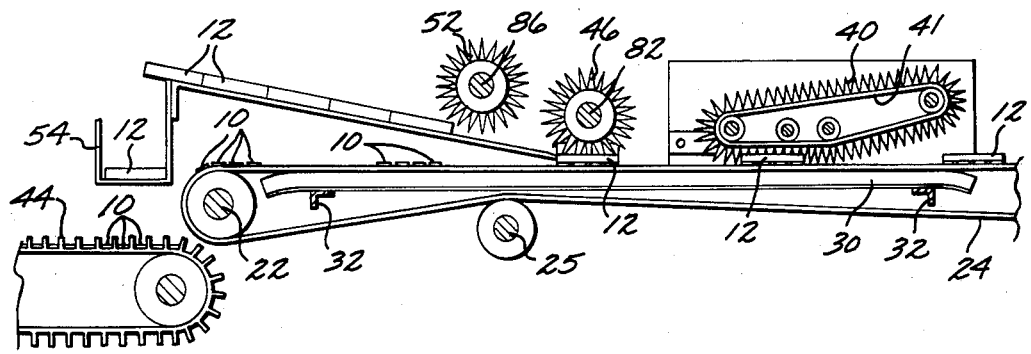
FIG. 14
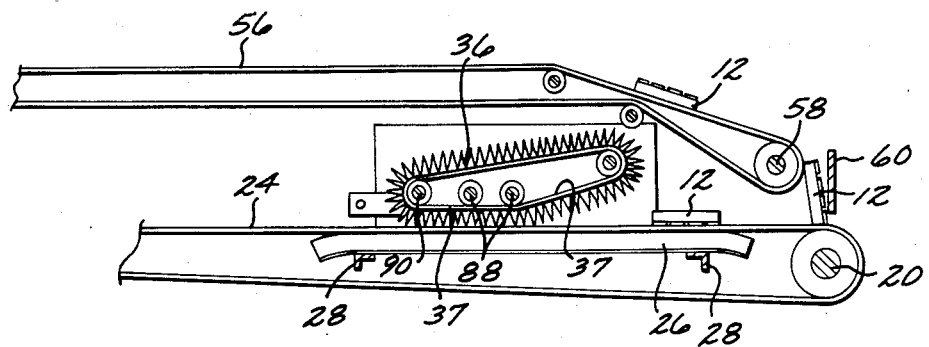

APPARATUS FOR REMOVING ADHERED FOOD PRODUCT FROM TRAY LATTICE

BACKGROUND OF THE INVENTION

1. Field of the Invention

The present invention relates to apparatus for separating a food product from a tray, and more particularly separation from a tray having apertures defining a supporting lattice to which the food product is adhered.

2. Description of Related Art

Certain food products tend to adhere to the surfaces supporting them during food processing. As explained in more detail in my U.S. Pat. No. 4,645,404, separation of the food product from supporting trays is difficult where the food product is in thin strip form, as is the case with the long strips of meat jerky for human or animal consumption.

In preparing jerky, a meat containing mixture is extruded to form thin elongated strips which are arranged on a tray having apertures defining a supporting lattice. The apertures permit air circulation during drying of the product, but the nature of jerky material is such that the strips stick to the ribs or lattice of the tray during drying. The problem is made worse because the strips of meat tend to sag into the apertures as the meat dries.

The long strips of jerky must be separated intact, without breaking, so that they can be cut into predetermined short lengths for packaging. Any broken pieces cannot readily be packaged and must be discarded.

The apparatus of my U.S. Pat. No. 4,645,404 provided reasonably satisfactory separation of the strips of meat jerky from the tray lattice. However, the apparatus involved a two step procedure to effect separation, and a significant number of long strips were still broken into commercially unusable short pieces. In that apparatus a pair of conveyor belts were arranged in spaced apart end-to-end relation to define a gap across which the food product tray was carried. Preliminary separation of the jerky strips lying on top of the tray lattice was accomplished by one or more separating rollers located below the tray. Radially directed fingers of the tray were arranged to project upwardly through the tray apertures and into engagement with the food product. At least two backup rollers were located above the tray opposite each separating roller. These engaged both the food product and the tray, allowing the food product between the rollers to be moved up from the tray by the roller fingers, but keeping the tray from also moving upwardly.

Some portions of the jerky strips still stuck to the tray at various points along their lengths. Final separation was achieved by transferring the trays onto a third conveyor belt disposed at right angles to the first pair of conveyors. In making the transfer, each tray was inverted so that the already loosened jerky strips hung down in loose loops. A stripper plate above the third belt was arranged to lie within the space between the tray and the sagging strips as they moved along the belt. The partically separated strips were then pulled away from the tray by the plate and transported to a collection station. Some of the strips still adhered sufficiently tenaciously that this pulling action resulted in their breakage.

SUMMARY OF THE INVENTION

According to the present invention, all food product separation occurs in a substantially continuous process on the same conveyor belt that supports the food product trays.

The trays are inverted on the conveyor belt, and the belt is moved past a first row of roller bands located above the belt and a row of supports located below the belt. The supports are rigid and transversely spaced apart for slidable engagement with the under side of the belt. The belt is sufficiently flexible that it sags between the supports in a catenary-like configuration.

The roller bands are located between the supports, and radially directed fingers of the roller bands project downwardly through apertures in the tray and press the food product into the spaces between the food product and the sagged portions of the belt. Thus, the food product can be pushed downwardly by the roller belt fingers onto the conveyor belt despite the fact that the same belt is providing support for the tray.

The tray is preferably made of a resiliently deformable material so that it is flexed between the roller bands and supports to facilitate food product separation.

Portions of the food product overlying the first row of supports are not easily reached by the fingers of the first row of roller bands. Accordingly, a second row of roller bands and supports are located behind or beyond the first row of roller bands and supports, in staggered or laterally offset relation to the first row so as to operate on the portions of the food strips that were not acted upon by the first row of roller bands and supports.

Tray separation from the conveyor belt is accomplished by a transfer plate spaced slightly above the conveyor belt to intercept and move each tray upwardly where it can be engaged by conveyor rollers which move it up a ramp to a tray collection station.

The apparatus of the present invention thus eliminates two step strip separation, accomplishing all separation by roller belt fingers projecting downwardly through the trays for strip separation onto the same conveyor belt which provides support for the trays.

Other objects and features of the invention will become apparent from consideration of the following description taken in connection with the accompanying drawings.

BRIEF DESCRIPTION OF THE DRAWINGS

FIG. 5 is a top plan view of the present apparatus;

FIG. 6 is a view taken along the line 6—6 of FIG. 5;

FIG. 7 is a diagrammatic side elevational view of the drive means for the roller bands and conveyors of the apparatus;

FIG. 8 is an enlarged view taken along the line 8—8 of FIG. 5;

FIG. 9 is an enlarged view taken along the line 9—9 of FIG. 5;

FIG. 10 is an enlarged view taken along the line 10—10 of FIG. 8;

FIG. 11 is a View taken along the line 11—11 of FIG. 5;

FIG. 12 is a view taken along the line 12—12 of FIG. 5;

FIG. 13 is a diagrammatic side elevational view of the discharge end of the apparatus, illustrating an embodiment utilizing a strip collector belt;

FIG. 14 is a diagrammatic side elevational view of the feed end of the apparatus, illustrating an embodiment employing a conveyor belt to transport inverted trays to the main conveyor belt;

DESCRIPTION OF THE PREFERRED EMBODIMENT

The present apparatus relates to the separation of strips of dried meat products from tray support surfaces to which the products are adhered. One such product is a mixture, by weight, of 75% meat by-products, 15% beef, 1% wheat flour, 1% cane molasses, 2% dextrose, 2% salt, 2% water, and 2% spices and preservatives. The mixture is extruded into meat strips 10 approximately 1¼ inch wide, 0.165 inch thick, and 48 inches long, following which the strips are dried, and then cut into lengths of about 4¼ inches for packaging.

Figure 1:
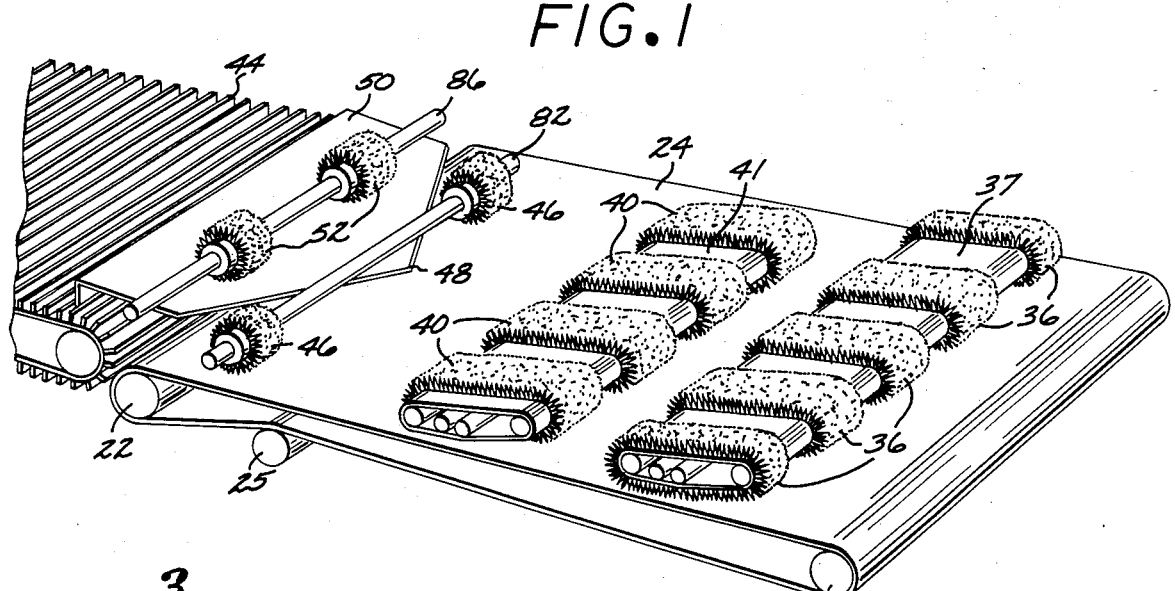
FIG. 1 is a diagrammatic perspective view of the present apparatus, and particularly the conveyor belt and overlying roller bands.
Figure 2:
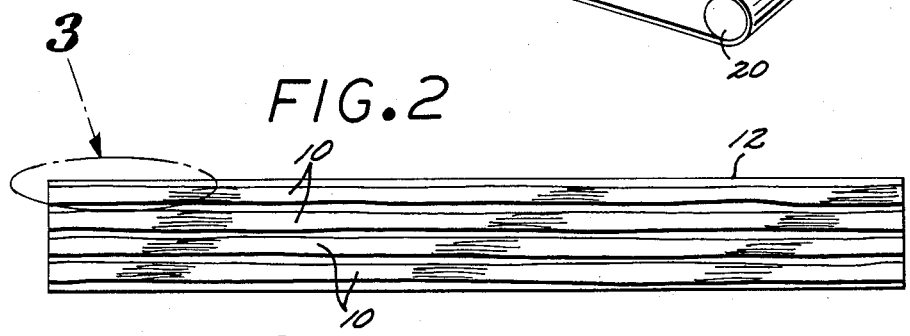
FIG. 2 is a top plan view of a tray supporting a plurality of jerky strips.
Figure 3:
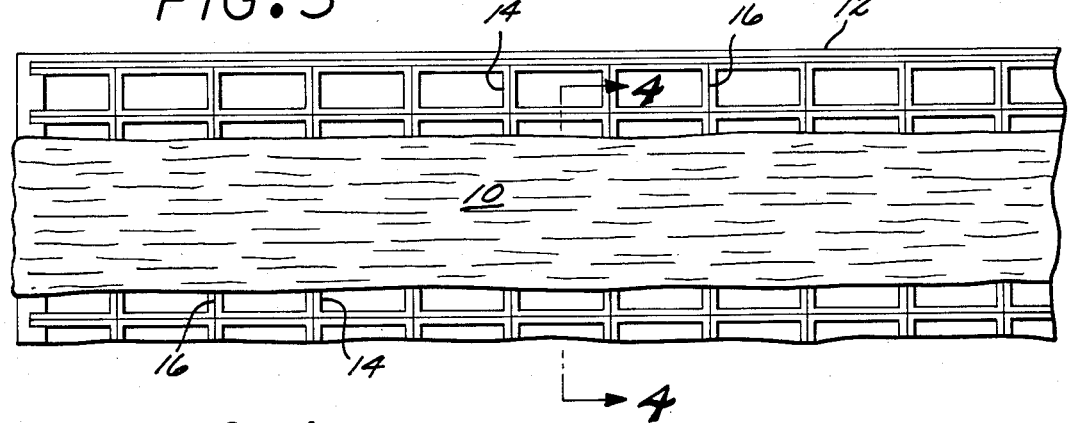
FIG. 3 is an enlarged view of the section indicated by the numeral 3 in FIG. 2.
Figure 4:
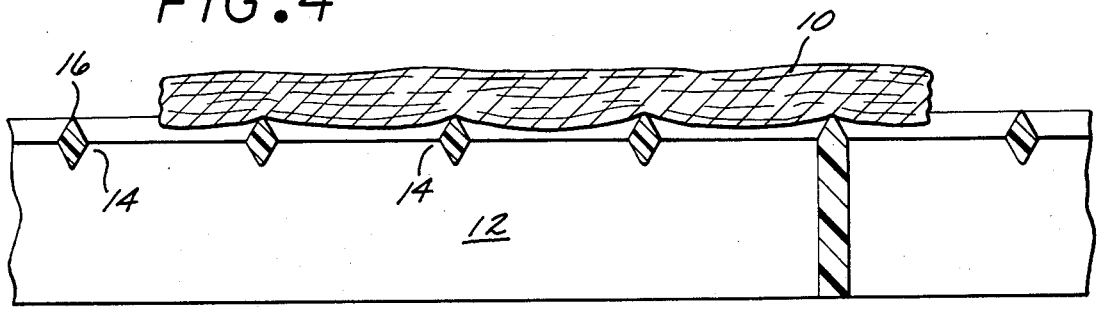
FIG. 4 is an enlarged view taken along the line 4—4 of FIG. 3.

FIGS. 2, 3 and 4 illustrate a tray 12 onto which the meat strips 10 are extruded. The tray 12 is typically made of resiliently deformable plastic about 6 inches wide and 48 inches long. Four strips 10 are supported on each tray, as seen in FIG. 4. Each tray 12 includes a plurality of apertures 14 arranged to define a supporting lattice 16 comprised of crosswise and lengthwise ribs. Each aperture 14 is about ⅜ inches wide and ¾ inches long, making a total of about 544 apertures per tray.

After the strips 10 are extruded onto the surface of the trays, the trays 12 are stacked on racks and placed in a drying oven (not shown) in which air circulates through the apertures 14, drying the meat strips 10 and forming a jerky product. During drying the strips 10 tend to bake onto and stick to the tray lattice 16, the strips also tending to sag into the apertures 14, as seen in FIG. 3. The purpose of the present apparatus is to remove the strips 10 from the trays without breaking the 48 inch long strips into unusable shorter pieces. The separated long strips can then be cut into the desired lengths of about 4¼ inches for packaging. As will be seen, the present apparatus accomplishes such separation through the unique interaction of separating roller bands and support structure located on opposite sides of the tray conveyor belt.

As best seen in FIGS. 1 and 5-7, the present apparatus includes a rigid frame, most of which is omitted for brevity, having a pair of longitudinally extending, transversely spaced apart I-beams or sides 18.

A continuous conveyor belt 24 is trained around rollers carried by a pair of belt shafts 20 and 22 which are rotatable in suitable bearings mounted to the front and rear extremities of the frame sides 18. Another roller, carried by an idler shaft 25 extending between the sides 18, presses upwardly against the conveyor belt 24 to eliminate slack and provide proper tensioning.

The belt 24 is preferably made of a wear resistant, flexible plastic material such as vinyl that can be tensioned longitudinally, but which droops or sags transversely in areas where it is unsupported. As will be seen, this feature is useful in the separating operation to be described.

The belt 24 is supported adjacent the front of the apparatus by a row of four longitudinally oriented, transversely spaced apart pipes or supports 26. The forward and rearward extremity of each support 26 is downwardly curved, as best seen in FIG. 6, to promote smooth engagement and disengagement with the underside of the upper run of the conveyor belt 24. The supports 26 are fixed against vertical movement by attachment to a pair of brackets 28 whose ends are fixed to the frame sides 18.

A second row of longitudinally oriented, transversely spaced apart pipes or supports 30 are located behind or beyond the supports 26. There are five such supports 30, all of which are downwardly curved at their forward and rearward extremities to facilitate sliding engagement with the underside of the upper run of the conveyor belt 24. The middle one of the supports 30 is approximately the same length as each of the forward supports 26, while the other four supports 30 extend from approximately the mid portion of the frame to its rearward extremity. In a manner similar to the mounting of the supports 26, the supports 30 are fixed against vertical movement by transverse brackets 32, two of which are seen in FIG. 6, which are attached at their ends to the frame sides 18.

It is important to note that the supports 30 are transversely offset relative to the supports 26. As will be seen, the flexible belt 24 is designed to hang or sag in a catenary-like configuration between adjacent supports 26, as seen in FIG. 8. As the belt 24 passes beyond the supports 26, the areas of such sagging changes so that the catenary-like sags of the flexible belt are longitudinally aligned with the first row of supports 26, as seen in FIG. 9.

The conveyor belt 24 supports each tray 12 and conveys it in the direction or conveyor path indicated by the arrow in FIG. 6. Each tray is placed across or transversely of the belt, and in an inverted position. The food product or strips 34 located on the underside of the tray thus engage the upper surface of the upper run of the conveyor belt 24, with the long axis of each strip 34 perpendicular to the conveyor path.

As the trays 12 move with the belt 24, separator means are arranged to project downwardly through the tray apertures 14 to engage with the strips 34 and gently separate them from the tray 12 and onto the upper surface of the belt 24.

The separator means comprise a row of five separator or roller bands 36 transversely spaced across and above the conveyor belt 24 adjacent the front end of the apparatus frame. The two outside roller bands 36 are narrower than the three central bands, but each band is characterized by a plurality of projections, protrusions, or fingers 38 made of flexible plastic material or soft rubber. Each finger 38 has a transverse cross-sectional area smaller than that of one of the apertures 14 so that the fingers can pass downwardly through the apertures into contact with the strips 10. As will be seen, the vertical position of the bands 36 can be adjusted so that engagement between the fingers 38 and the strips 10 is firm enough to separate the strips from the tray lattice 16 but not forceful enough to unduly deform and break the strips. This separating action is seen in FIGS. 8 through 10.

The base fabric or material of which the bands 36 is made is commercially available in wide, continuous belts. These are cut into narrow bands to provide the bands 36 with the integral fingers 38. Although the bands 36 could be adhered or otherwise secured to the periphery of large rollers carried on transverse shafts extending above the conveyor belt 24, the bands 36 are preferably adhered in transversely spaced apart relation to one another on a wide separator belt 37 which extends across and above the belt 24. The belt 37 is supported so that each individual roller band 36 is upwardly inclined at its leading extremity, enabling a tray 12 to easily pass below the front of the roller band. The fingers 38 thereafter come into progressively closer relationship with the strips, and then firmly engage them along a rearward, horizontally disposed extremity of the band 36.

The sagging of the belt 24 between the supports 26 is clearly evident in FIG. 8, as is the projection of the fingers 38 through the tray apertures and into engagement with the strips 10. The sagging or yieldability of the flexible belt 24 between the supports 26 provides a space into which the strips 10 can be moved to separate them from the tray lattice portions between the supports 26. The size of the space is somewhat exaggerated for clarity. In some instances a pre-existing space is not necessary so long as the belt 24 is made sufficiently yieldable that it will move away from the tray with the separated food strips to accommodate their presence on the belt. Although not clearly seen in the drawings, the action of the fingers 38 on the tray also bends or flexes the portions of the tray 12 between the supports 26. This flexing induces relative movement between the adhered food product and the tray, and further facilitates separation of the strips 10 from the tray lattice 16.

FIG. 10 illustrates in detail the action of the fingers 38 in separating the strips 10 from the tray lattice 16 and into the spaces defined by the sagging portions of the conveyor belt 24. However, the portions of the strips 10 located between the roller bands 36 are not reached or engaged by the fingers 38 of the bands, and consequently separation of the strips 10 in these areas is not achieved.

Accordingly, a second row of four roller bands 40 is mounted on a continuous separator belt 41 like the front separator belt 37. The bands 40 are identical in construction and orientation to the bands 36, but are arranged behind the bands 36 and in transversely offset or staggered relation, that is, out of longitudinal alignment with the bands 36 and in longitudinal alignment with the supports 26 between the bands 36. With this arrangement the fingers 42 engage those portions of the food strips 10 not previously acted upon and separated by the fingers 38 of the first roller bands 36. The action of the fingers 42 on the strips 10 is best seen in FIG. 9.

The separated strips 10 pressed onto the conveyor belt 24 by the separating fingers 38 and 42 are carried by the conveyor belt 24 to its discharge end. At that point the belt 24 reverses direction around a belt shaft 22, as seen in FIG. 13. The strips can be collected in a bin (not shown), or a strip collection belt 44 can be located below the belt shaft 22 to catch the strips as they fall off the belt 24. The collection belt 44 preferably includes transverse ridges or ribs forming individual recesses for the strips 10. The collected strips are carried by the collection belt 44 to a station (not shown) where they are cut into shorter lengths and packaged.

The empty trays 12 leaving the rollers belts 40 are engaged adjacent their ends by a pair of rollers 46. These rollers have a continuous band of material adhered to their periphery like the material of the bands 36 and 40, and with the same type of flexible fingers. The rollers 46 engage the tray ends and force it into a horizontal plane, which is necessary for trays which have become warped through continued usage. In a horizontal plane the tray is properly positioned for interception by the pointed end 48 of a tray raising plate 50.

Plate 50 extends across the belt 24 and is secured at its opposite sides to the frame sides 18. As the tray moves toward it the end 48 passes beneath the tray 12 and above the sagging strips 10 and belt 24, as seen in FIG. 11.

The tray portion between the rollers 46 is flexed downwardly to help in completing the separation of the strips 10 from the tray lattice 16.

A pair of rollers 52 identical to the rollers 46 are located beyond and transversely inwardly of the rollers 46 to engage each tray 12 as it leaves the rollers 46, as seen in FIG. 12. The trays raised by plate 50 from the conveyor belt are first driven up the inclined surface of the plate 50 by the rollers 46, and then further driven downwardly by the rollers 52 until the end ones of the trays 12 drop into a pair of collection hangers 54 mounted to the rearward end of the plate 50. From this point the trays can be taken up for reuse in the strip processing operation.

Although the trays 12 can be manually inverted and placed on the belt 24 at the forward or feed end, as seen in FIG. 6, this operation is preferably automated by using a tray feed belt 56, as seen in FIG. 14. Trays coming from the drying oven (not shown) are normally in the upright position seen in FIG. 14, and the belt 56 is operated to bring the upright trays to a point adjacent an end shaft 58 where the direction of travel of the belt 56 reverses. The trays fall off the belt 56 and engage a vertical front plate 60 attached at its ends to the frame sides 18. The plate 60 holds the upper side of the tray against movement with the belt 24 so that the lower side of the tray 12 can be engaged by the belt 24 and carried away from the plate 60. This inverts the tray 12 and locates the food product on the underside of the tray.

The showing in FIG. 7 is exemplary of the means by which the various belts and rollers of the apparatus are driven and adjusted for operation.

The drive means comprises a suitable electric motor 62 which is mounted on the apparatus frame and operated to rotate a sprocketed drive shaft 64. This drives a chain engagable with a pair of sprocketed shafts 66 and 68.

Rotation of the shaft 66 is transmitted by a chain 70 for rotation of a sprocket mounted to the rear conveyor belt shaft 22. The belt roller on the shaft 22 acts upon the conveyor belt 24 to move it along the conveyor path previously described.

Rotation of the other sprocketed shaft 68 adjacent the motor 62 operates a drive chain 72 which rotates a sprocketed shaft 74 which drives the separating belt 41. A chain 76 trained about the sprocket of the shaft 74 also rotates a sprocketed shaft 78 which drives the separating belt 37.

Another chain 80 engages a sprocket of the shaft 68 and drives a sprocketed shaft 82 which is rotatable to drive a shaft 82 carrying the pair of rollers 46. The shaft 86 mounting the rearward pair of rollers 52 is driven by a chain 84 extending between the sprockets of the shafts 82 and 86.

The means for adjusting belt tensions and relative positions of the apparatus components is best seen in FIGS. 7, 13 and 14. The horizontal portion of the lower run of the separator belt 37 is urged downwardly by a pair of transverse rollers mounted to a pair of forwardly located adjustment shafts 88. As seen in FIG. 7, the vertical position of the shafts 88 can be adjusted by tightening or loosening nuts 92 which bear against an upward extension of the frame sides 18 and which operate upon vertical studs to raise and lower the bearing blocks which rotatably carry the shafts 88.

A similar arrangement of nuts 94 acting upon blocks mounting a pair of transverse adjustment shafts 96 raises and lowers the shafts 96 to adjust the vertical position of associated transverse rollers acting upon the horizontal portion of the lower run of the rearward separator belt 41.

The foregoing arrangement enables the degree of separating force exerted by the respective roller band fingers 38 and 42 to be adjusted for firm food strip separation, but without strip breakage.

An adjustment shaft 90 mounts an idler roller engaged upon the rearward portion of the separator belt 37 where it changes direction. The longitudinal position of the idler roller can be adjusted by tightening or loosening a nut 100, which adjusts the tension in the belt 37. Similarly, a nut 102 can be tightened or loosened to adjust the longitudinal position of a shaft 98 which mounts the idler roller engaged upon the separator belt 41, thereby adjusting the tension in the belt 41.

In operation, each tray 12 carrying food product strips 10 is placed in inverted position upon the conveyor belt 24, either manually or by the belt conveyor means of FIG. 14. The trays are carried by the conveyor belt 24 to the first row of roller bands 36, where the separating action illustrated in FIG. 8 occurs. The food product strips 10 are displaced downwardly from the tray 12 by the fingers 38 and into the space which exists by virtue of the cantenary sag of the belt 24 between each pair of adjacent supports 30. As previously indicated, displacement of the strips is not necessarily into existing sag spaces, but may be into spaces formed by downward yielding of the belt 24.

The portions of the food strips 10 not reached by the action of the roller fingers 38 are next acted upon by the fingers 42 of the roller bands 40 as the trays pass along the conveyor path, resulting in the separating action illustrated in FIG. 9.

Finally, the separated food strips are carried onto the strip collection belt 44, while the trays are moved up the inclined plate 50 onto the collection brackets 54 by the successive action of the rollers 46 and 52, as seen in FIG. 13.

The separating action developed by the roller bands 36, followed by the roller bands 40, and finally by the rollers 46, has been found to separate the strips 10 from the trays 12 with insignificant or no strip breakage. Moreover, utilization of the flexible conveyor belt 24, which sags or yields transversely between its underlying supports, makes possible separation of the strips in an essentially single operation, that is, with all separation occurring onto the same conveyor belt which supports and conveys the trays through the apparatus.

Figure 15:
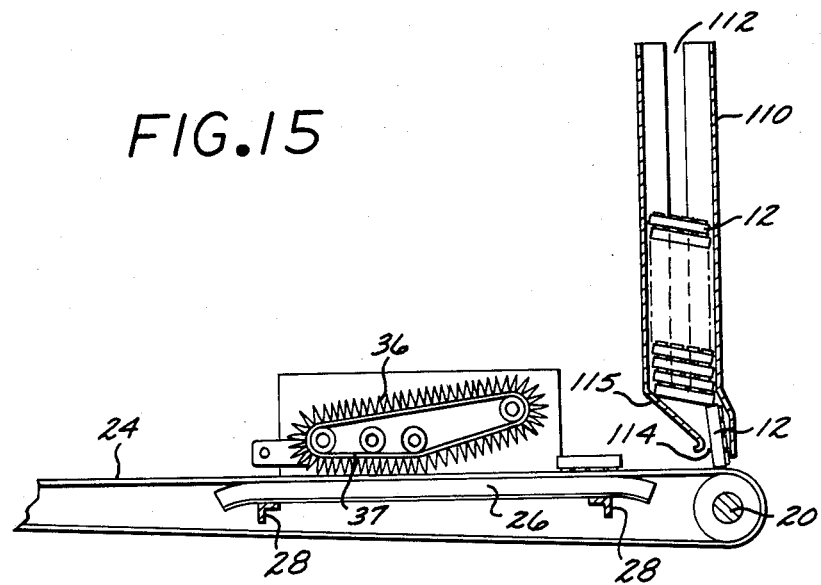
FIG. 15 is a diagrammatic side elevational view similar to FIG. 14 but showing an alternate tray inverting chute.

Referring now to FIG. 15, there is shown an alternate arrangement for feeding and inverting for the trays 12 onto the conveyor belt 24. Such means includes a vertical chute 110 having an open top 112 through which loaded trays 12 may be fed. The lower end of chute 110 is of reduced aide area and defines a tray discharge opening 114. The front of the discharge opening 114 is defined by a rearwardly and downwardly inclined wall 115 of chute 112. It will be apparent that as lowermost tray 12 enters the lower portion of chute 110, the inclined wall 115 will cause the tray to tilt into a generally, vertically extending position and forward movement of the upper run of the conveyor belt 24 (to the left of FIG. 15) will cause the tray to flip into an inverted position, with the meat strips 10 facing downwardly against the upper surface of the conveyor belt 24.

Figure 16:
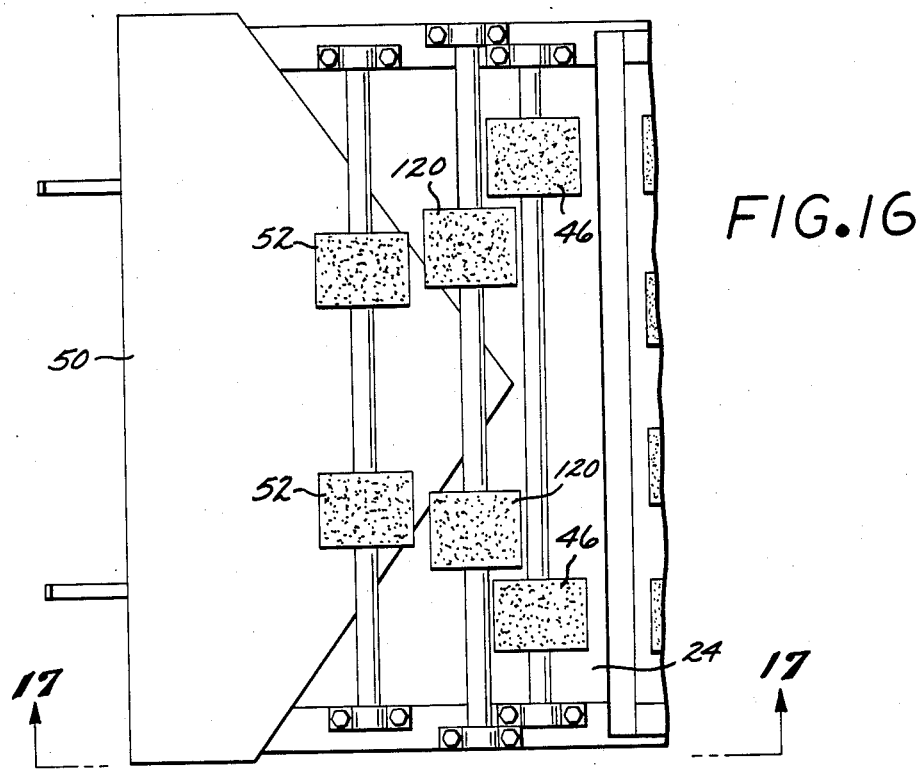
FIG. 16 is a fragmantary top plane view of an alternate empty-tray engaging roller cosntruction.
Figure 17:
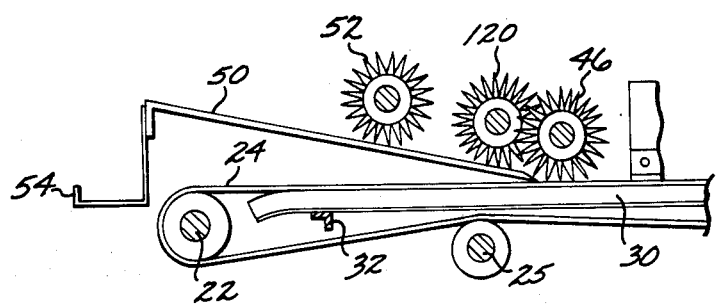
FIG. 17 is a side elevational view taken along line 17—17 of FIG. 16.

Referring now to FIGS. 16 and 17, there is shown a modified arrangement of the empty tray-engaging rollers designated 46 and 52 in FIG. 13. In the embodiment of FIG. 16, an extra set of rollers 120 are interposed between rollers 46 and 52 to assist in preventing the empty trays fro being twisted as they pass from plate 50 onto the upper run of conveyor belt 24.

Various modifications and changes may be made with regard to the foregoing detailed description without departing from the spirit of the invention.

What is claimed is:

1. Apparatus for separating a food product from a tray having apertures defining a supporting lattice to which the food product is adhered, the apparatus comprising:

conveyor means including a conveyor belt for supporting and moving the tray along a conveyor path with the food product extending across the conveyor path in engagement with one surface of the conveyor belt;

a pair of transversely spaced apart support means engaging the opposite surface of the conveyor belt to support the conveyor belt during its travel along the conveyor path; and separator means located between the pair of support means and adjacent the one surface of the conveyor belt, and operative through the apertures of the tray to move the food product toward the conveyor belt to separate it from the adjacent tray lattice between the pair of support means.

2. Apparatus as set forth in claim 1 wherein the conveyor means is adapted to support the tray with the food product engaged upon the upper surface of the conveyor belt, and wherein the pair of support means engage the undersurface of the conveyor belt.

3. Apparatus as set forth in claim 1 wherein the separator means comprises a roller band having radially directed fingers adapted to project through the tray apertures and move the food product to separate the food product from the adjacent tray lattice.

4. Apparatus as set forth in claim 3 wherein the separator means further comprises roller bands operative to flex the tray between the pair of support means to facilitate separation of the food product from the adjacent tray lattice.

5. Apparatus as set forth in claim 1 and including means for receiving and inverting the tray on the conveyor belt with the food product in engagement with the upper surface of the conveyor belt.

6. Apparatus as set forth in claim 1 wherein the conveyor belt is sufficiently flexible between the pair of support means that the separator means is able to move the food product away from the tray lattice between the pair of support means without interference with the conveyor belt.

7. Apparatus for separating an elongated food product strip from a tray having apertures defining a supporting lattice to which the strip is adhered, the apparatus comprising:

conveyor means including a conveyor belt for supporting and moving the tray along a conveyor path with the strip extending across the conveyor path in engagement with the upper surface of the conveyor belt;

a row of transversely spaced apart first support means engaging the undersurface of the conveyor belt to support the conveyor belt during its travel along the conveyor path;

a row of transversely spaced apart second support means behind the first support means and engaging the undersurface of the conveyor belt to support the conveyor belt during its travel along the conveyor path beyond the first support means, the second support means being out of longitudinal alignment with the first support means;

a row of transversely spaced apart first roller means located above the conveyor belt, and laterally offset relative to the first support means, respectively, each of said first roller means having radially directed fingers adapted to project through the tray apertures to move the strip toward the conveyor belt to separate it from the adjacent tray lattice located between the adjacent ones of the first support means; and a row of transversely spaced apart second roller means located above the conveyor belt, and laterally offset relative to the second support means, respectively, each of said second roller means having radially directed fingers adapted to project through the tray apertures to move the strip toward the conveyor belt to separate it from the adjacent tray lattice located between the adjacent ones of the second support means.

8. Apparatus as set forth in claim 7 wherein the first and second roller means is operative to flex the tray between the adjacent ones of the first and second support means to facilitate separation of the strip from the tray lattice.

9. Apparatus as set forth in claim 7 and including means for receiving the tray with the tray lattice and strip upwardly disposed, and operative to invert the tray on the conveyor belt with the tray lattice and strip downwardly disposed.

10. Apparatus as set forth in claim 7 wherein the conveyor belt is sufficiently flexible between adjacent ones of the first and second support means that the first and second roller means are able to move the strip away from the tray lattice between adjacent ones of the first and second support means without interfering engagement between the strip and the conveyor belt.

11. Apparatus as set forth in claim 7 wherein the first and second support means each comprise a longitudinally oriented element fixed against vertical movement.

12. Apparatus as set fort in claim 7 and including a transfer plate beyond the second roller means and operative to engage the tray and separate it upwardly from the conveyor belt.

13. Apparatus as set forth in claim 7 and including a collector belt operative to receive the strip from the conveyor belt.

14. Apparatus as set forth in claim 9 wherein the means operative to invert the tray on the conveyor belt include a vertically extending tray-receiving chute having at its lower portion a rearwardly extending plate which defines the front of the discharge opening of the chute and flips each tray as it leaves the lower end of the chute towards a vertical position.

* * * * *